April 3, 1951

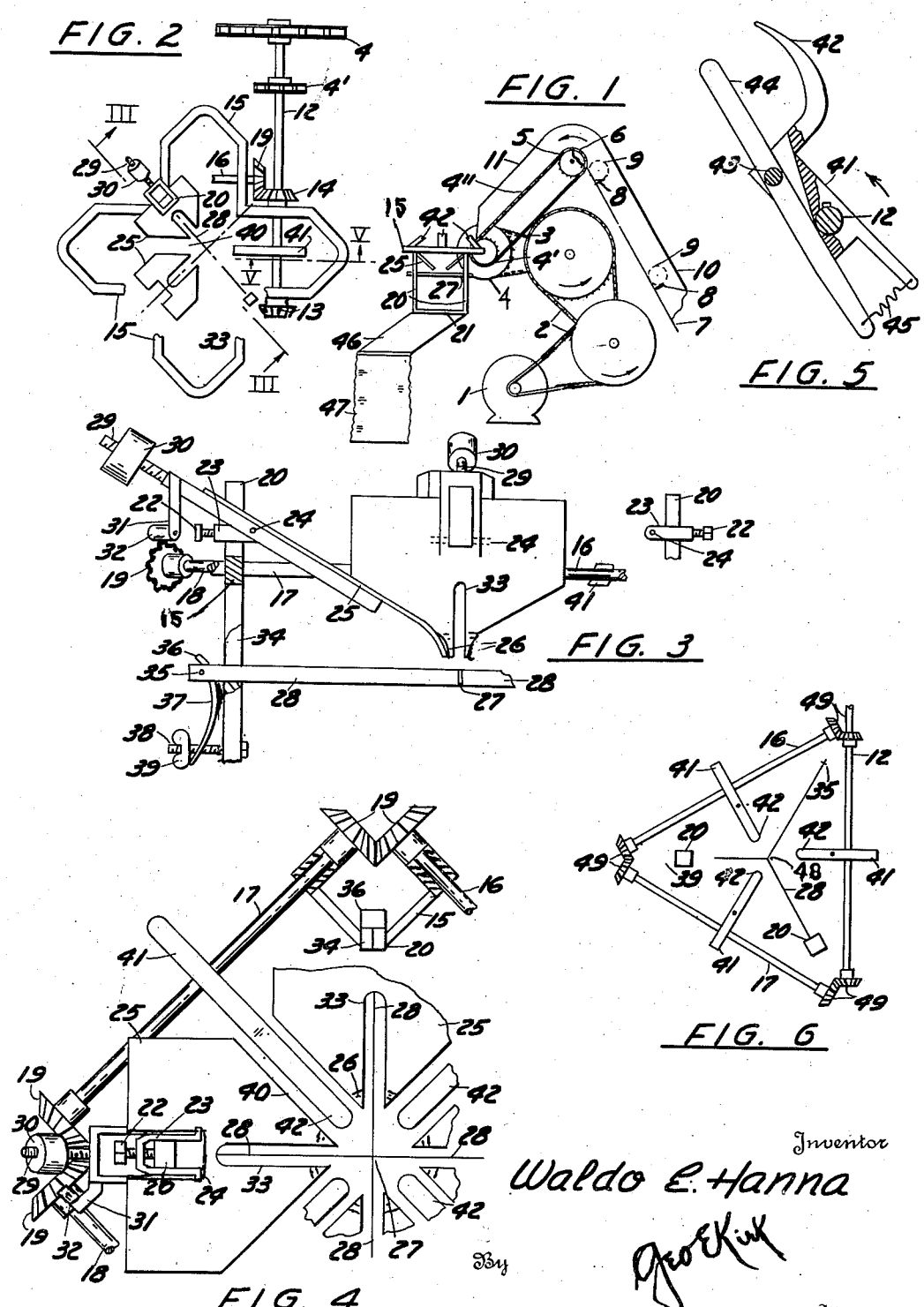

W. E. HANNA 2,547,702

SEED POTATO SLICER

Filed Aug. 4, 1947

WALDO E. HANNA
Inventor

Atty.

Patented Apr. 3, 1951

2,547,702

UNITED STATES PATENT OFFICE 2,547,702

SEED POTATO SLICER

Waldo E. Hanna, Mount Cory, Ohio

Application August 4, 1947, Serial No. 765,884

1 Claim. (Cl. 146—164)

This invention relates to dispensing from bulk quantities of rollable objects, and during such dispensing subdividing the objects.

This invention has utility when incorporated in power driven equipment wherein the feeder may be an elevator type of conveyor, with a receiver hopper therefrom to which the objects, as seed potatoes, may be dispensed one-at-a-time in sequence to a cutter. At this cutter the potatoes are forced thru the chute or hopper to be there cut or sliced into sections. The preferred positioning for the potato at this slicing operation is to have eyes of the potatoes distributed to the several sections.

Referring to the drawings:

Fig. 1 is a side elevation, partially diagrammatic, of a complete operative assembly comprising a feeder elevator with a chute therefrom to a hopper containing the slicer of the invention, with showing of a drive therefor;

Fig. 2 is a plan view of frame portions and some of the chute elements for the slicer, the location of the knives for the slicer being shown in broken lines, the scale being somewhat enlarged over the showing in Fig. 1;

Fig. 3 is a view, mostly in elevation, in the region of the line III—III, Fig. 2, of some details of the rockable chute elements;

Fig. 4 is a fragmentary plan view of the chute features of Fig. 3, and being diagrammatic as to the knife features;

Fig. 5 is a view on an enlarged scale from the line V—V, Fig. 2, with a portion broken away, of the thrusting finger device;

Fig. 6 is a diagrammatic showing in plan of drive features and the knives for a three sided unit.

The feeder and drive

Figure 7:
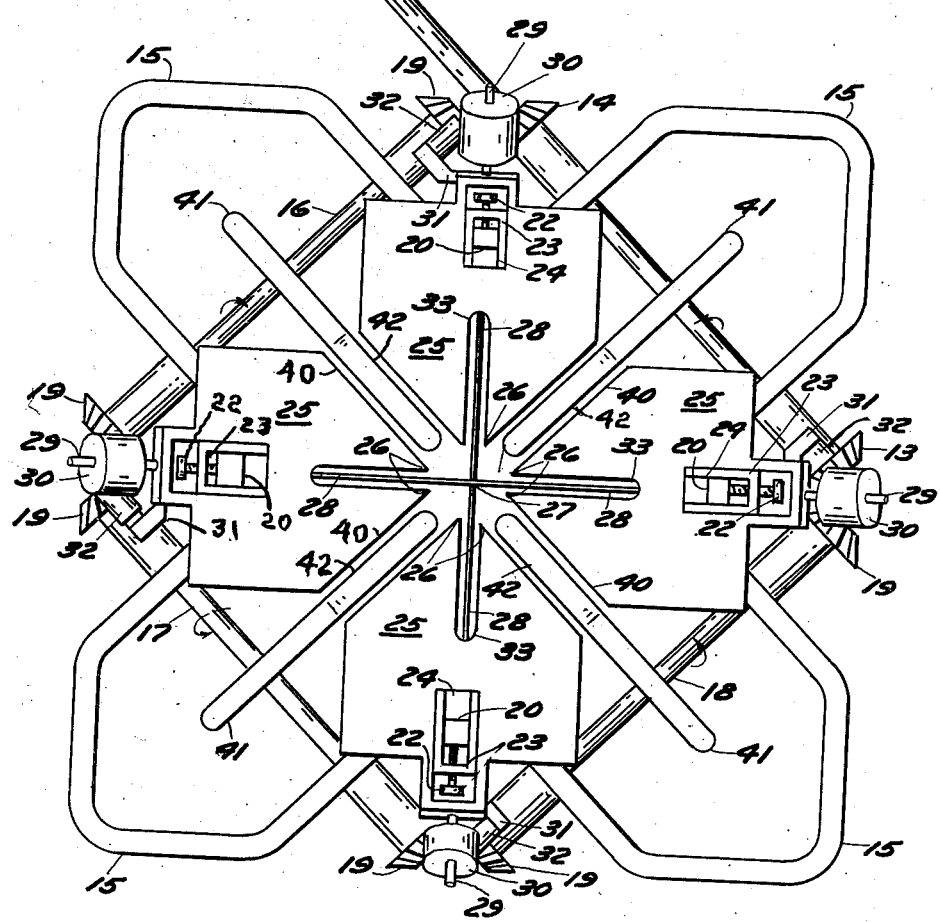
Fig. 7 is in the quadruplicate for the plan showing of Fig. 4 in association with the frame of Fig. 2.

An electric motor 1 (Fig. 1) has therefrom endless belt speed reduction transmission 2 to a sprocket chain 3. The chain 3 extends about a sprocket wheel 4. Coaxially fixed with the wheel 4 is a sprocket wheel 4' from which extends a sprocket chain 4" to a follower wheel 5 of similar diameter with the wheel 4'. A sprocket wheel 6 is coaxial of and fixed to rotate with the wheel 5. A conveyor chain 7 passes about the wheel 6. The chain 7 has flights 8, spaced apart approximately the periphery of the wheel 6 in providing an elevator for one potato 9 to be propelled upward in a chute 10 by each flight 8. Such respective potatoes 9, upon passing the wheel 6 in succession tumble down a chute 11 to fall into the hopper or sectional chute of the slicer of this invention.

The slicer

The sprocket wheel 4 (Figs. 1, 2, 7) is fixed on a shaft 12 adjacent the wheel 4'. The shaft 12 has fixed therewith a pair of bevel pinions 13, 14, in the region of a four-arm frame 15. The frame 15 provides bearings to support shafts 16, 17, 18, in the form of a rectangle in a plane with the shaft 12. The shafts 16, 17, 18, at their ends have bevel pinions 19 in mesh relation with each other and the pinions 13, 14, to make a closed circuit, looking down on which the direction of rotation of the respective shafts being for the top side inward.

The slicer chute

U-shaped supports 20, 21, 20 (Fig. 1) provide mounting for the frame 15. Near the upper end of each support 20 outer side is a set screw 22 (Figs. 3, 4, 7) in a loop portion 23. The portion 23 in its extent to embrace the support 20 has inward therefrom a bearing 24 for rockably mounting a chute section 25. The set screw 22 serves as up and down adjusting means on the support 20 for shifting the chute section rock axis up or down relatively to the plane of the frame 15. The respective chute sections 25 have an inward and downwardly extending deflection to narrowing forks 26.

The converging free ends of the four pair of forks approximate a plane. Centrally, slightly below this plane is a knife intersection 27 from which cutter blades 28 diverge and have direction between the respective fork prongs medially of the chute section.

The outward and upward portions of the chute sections 25 remote from the downwardly deflected fork tine ends 26, have medially threaded extensions 29 along each of which is adjustable a counterweight 30. A descending potato 9 from the chute 11 to strike the chute section 25 near the fork region 26 is not free to rock the section 25 on its bearing 24. Some resistance thereto is provided by the overloading of the outer end of the section 25 by its adjusted counterweight 30. The descent from such overloading is limited, by a depending arm 31 adjacent the stem 29. The lower portion of the arm 31 mounts a roller 32 to ride on a bevel pinion 13, 19. The result from this assembly is that during the driving operation thru the shaft 12, the rollers 32 (Figs. 3, 4, 7) are joggled by the teeth of the pinions 13, 19, and act thru the arms 31 rigidly connected to the chute section 25, to vibrate rapidly the sections 25. This wobbling up and down of the counterweights 30 is transmitted to the forks 26 in so agitating the potato that it tends to have its major cross-section region directed flatwise toward the slicer region 27. The lengthwise portion or longer dimension of the potato 9 is thus established as approximately horizontal.

*Potato slicing transit*

The respective chute section 25 between the tines of their forks 26 have a clearance 33 toward their bearings 24. As there may be downward swing of the forks 26 in discharging a potato to the slicer knives 27, 28, such is permitted by the clearance regions 33. The uprights 20 have slots 34 (Fig. 3) thru which edgewise drawing of the blades 28 taut is effected by crosspins 35, engaged by a fork 36 having a depending rocker 37 to a screw thread 38 where a wing nut 39 may be adjusted for tensioning the blade 28, as to the support 20.

In the diagonal regions of the frame 15, or from the mid section regions of the rectangle provided by the shafts 12, 16, 17, 18, there is between the sections 25, clearance 40 (Figs. 2, 4, 7). In register with this clearance region 40, each of these shafts 12, 16, 17, 18, mounts an arm 41 to rotate therewith. Each arm 41 (Fig. 5) has rigid therewith an upwardly offset claw or finger portion 42. Adjacent such offset there is pivotal mounting 43 for a relatively straight finger portion 44, which in the counterclockwise direction of rotation (Fig. 5) has the portion 44 in advance of the finger 42. This advance position for the finger 44 is yieldable due to a spring 45 under tension at the remote end of the finger 44 in connection to the arm 41.

Upon delivery of a potato 9 from the chute 11 to fall toward the sections 25, there is vibration of the sections 25 from the rollers 32. This occurs during the rotation of the shafts 12, 16, 17, 18, in synchronism with each descending potato 9 for the four converging fingers 44 yieldably to thrust the potato 9 into the fork converging region toward the intersection 27. Directly following this yieldable location operation on the potato, there is a positive thrust as the fingers or claws 42 now act and overcome the counterweights 30 in pushing the potato as directed by the forks 26 to pass astride the intersection 27 and for the slicing operation to occur due to this positive action of the group of four arms 41, 42. The arms 41, 42, in the clearance regions 40 between the chute sections 25, engage only the potato to be sliced and do not extend to contact the intersection 27 or the blade portions 28 therefrom. There is ample space for these arms 41, 42, to make the complete rotation within the open arm or lobe portions of the frame 15.

The four-way sliced or quartered potato sections fall from the knives 27, 28, to an inclined chute 46 (Fig. 1) to pass along into a container or bag 47. These are seed sections now ready for planting.

In the handling of larger potatoes, quartering is found an acceptable practice. For potatoes of less dimension, the slicing may be say into thirds. For a slicer of such embodiment, from an intersection 48 three blades 28 may diverge (Fig. 6). To take care of 60° divergence between the shafts 12, 16, 17, bevel gears 49 are in mesh therebetween.

What is claimed and it is desired to secure by Letters Patent is:

A potato slicer comprising an open frame, an annular series of downwardly converging chute sections to form a discharge, pivotal mountings on the frame for the respective sections spaced outward from the region of the discharge, said mountings locating the sections with clearance spaces therebetween, rotatable arms swingable thru said clearance spaces from substantially above the chute sections downwardly toward said discharge, said sections having opposed slots, said spaces and slots alternating to form a series of narrow openings radiating from the discharge, diverging stationary knife blades fixed to the frame in proximity to the discharge and registering with the slots in the sections swinging theretoward, a power actuated shaft, additional shafts operatively connected with said power actuated shaft and providing mounting means for operating said arms, and vibrator devices operatively connected between the additional shafts and the chute sections remote from the discharge to oscillate the sections on their pivotal mountings and thereby jostle a potato in its descent upon the sections to lodge at the discharge in position for the arms to push on portions of the potato between the knife blades and urge it past the blades.

WALDO E. HANNA.

REFERENCES CITED

The following references are of record in the file of this patent:

UNITED STATES PATENTS

| Number | Name | Date |
|---|---|---|
| 484,995 | Burns | Oct. 25, 1892 |
| 555,918 | Ayer | Mar. 10, 1896 |
| 1,137,870 | Lahr | May 4, 1915 |
| 1,154,765 | Harrison | Sept. 28, 1915 |
| 1,227,056 | King | May 22, 1917 |
| 1,337,968 | Schroeder | Apr. 20, 1920 |
| 1,432,152 | Bornholdt | Oct. 17, 1922 |
| 1,890,155 | Israelton | Dec. 6, 1932 |
| 1,990,774 | Butler | Feb. 12, 1935 |
| 2,154,412 | Romberg | Apr. 11, 1939 |
| 2,288,756 | Thompson | July 7, 1942 |
| 2,395,350 | Smith | Feb. 19, 1946 |